Nov. 7, 1950        R. SHERMAN        2,528,558

MAINTENANCE OF CONDUCTIVITY IN ELECTRICAL SYSTEMS

Filed Dec. 31, 1946        6 Sheets-Sheet 1

INVENTOR.
Ralph Sherman
BY
Michaelis & Michaelis

Nov. 7, 1950            R. SHERMAN            2,528,558

MAINTENANCE OF CONDUCTIVITY IN ELECTRICAL SYSTEMS

Filed Dec. 31, 1946            6 Sheets-Sheet 2

INVENTOR.
Ralph Sherman
BY
Michaelis & Michaelis
attys.

Nov. 7, 1950   R. SHERMAN   2,528,558
MAINTENANCE OF CONDUCTIVITY IN ELECTRICAL SYSTEMS
Filed Dec. 31, 1946   6 Sheets-Sheet 4

INVENTOR.
Ralph Sherman
BY
Michaelis & Michaelis
attys.

Patented Nov. 7, 1950

2,528,558

UNITED STATES PATENT OFFICE 2,528,558

MAINTENANCE OF CONDUCTIVITY IN ELECTRICAL SYSTEMS

Ralph Sherman, Warren, Ohio

Application December 31, 1946, Serial No. 719,368

8 Claims. (Cl. 171—97)

This invention relates to the maintenance of conditions of good conductivity in electric systems. It is concerned more particularly with the protection of low voltage and current circuits, such as measuring circuits, signalling circuits and the like containing a number of contacting conductive parts (contacts).

It is a well known fact that electric systems of this kind are frequently endangered by an appreciable deterioration of contact between contacting conductive parts, which may be caused by the formation of thin oxid layers and other insulating layers at points exposed to the action of heat, dust, oxidizing gases or the like.

It is one of the objects of this invention to maintain, in spite of such disturbances, a fair degree of conductivity at such contacts whereby to prevent temporary or extended interruption of the circuit.

It is thus, an object of the invention to obtain a high degree of reliability and continuity of service in electric systems and in devices for electric systems such as protective circuits and measuring circuits, including those circuits in which relatively low voltages act, or in which even very slight deterioration of contacts or minute deviation in contact resistance may have disadvantageous or even disastrous results. A further object of the invention is to provide circuit restoration means which are not only highly reliable and have assured continuity of functioning, but which are also inexpensive and of the utmost simplicity.

Still another object of the invention is to provide a restoration system in which a simple reliable source of circuit restoring current may be employed, which is constant in its characteristics and which is not affected in its reliability of functioning by variations in the circuits in which conditions are to be restored. Still another object of the invention is to provide a restoration system employing a restoration current which is itself free from contacts or circuit connections, the deterioration of which may affect its continuity of output or its operating condition, except for such contacts and circuit connections as are automatically restored by the functioning of the restoration systems.

Another object of the invention is to provide a restoration system which, within the operating range of the apparatus, applies increasing restoration effect as the need therefor increases, that is, in which the effect is in proportion to the degree of deterioration of the circuits in which restoration is to be accomplished.

Still another object of the invention is to provide circuit restoration means which are highly sensitive and effective for bringing about a correction of contact deterioration even in the case of very slight increase of contact resistance and which, moreover, are effective not only for movable contacts such as striking contacts of relays, contactors of the like or sliding contacts of selector switches, knife switches or the like, but also permanent or fixed contacts such as bolted and riveted connections and the like. It is moreover, an object of the invention to provide an arrangement in which effective circuit restoration takes place with respect to the appearance of small contact resistance or small variations of resistance in comparison with the inherent internal resistance of the restorer current source. Still another object of the invention is to provide a circuit restoration system which may readily be checked visually or automatically by simlple reliable means to assure the operator of effective functioning of the circuit restoration system.

Other and further objects, features and advantages of the invention will become apparent as the description proceeds.

In a copending application filed of even date with the present application, I have disclosed and claimed a method of testing and eventually improving the conditions of conductivity of electric systems containing contacts which comprises sending from time to time through the contacts current impulses of a voltage exceeding the voltage normally impressed on the contacts to such an extent that any insufficiently conductive layer which may have formed between the contacting parts, is punctured and full conductivity restored. In order to prevent the current impulses from damaging or otherwise endangering the instruments inserted in the circuit, it was necessary to cut out that section of the circuit which contains such instrument, whenever the impulses were to be sent through the system.

This application is a continuation in part of my application Serial No. 495,311, filed July 19, 1943, now Patent No. 2,459,186, dated January 18, 1949.

According to the present invention, good conditions of conductivity can be maintained, without any part of the circuit being required to be cut out beforehand, by providing means for guiding the restoring current in such manner as to allow it to act on the contacts without reaching the instrument or instruments. In consequence of this arrangement the restoring current can be fed permanently to the circuit to be protected. This current will as a rule be furnished by a separate source, whose E. M. F. amounts to a multiple, frequently a thousandfold of that which normally arises as drop of potential in that section of the circuit. This materially higher E. M. F. causes any considerable insulating layer formed between two contacting parts to be punctured at once and a degree of conductivity to be restored which offers no prohibitive resistance to the passage of very small measuring currents.

Restoring may already take place with a current amounting to a fraction of one ampere. However, the maximum amperage to be supplied to contacts of low amperage measuring circuits must not exceed a few amperes, as otherwise the to be restored contact might burn out. Thus, according to the present invention, the restoring current may be fed to the system to be protected permanently and without any interruption and any deteriorated contact will be improved and full conductivity restored by it automatically, while the main circuit is traversed by its working current.

The guiding or blocking means which deflect or block the auxiliary restoring current from the section containing sensitive instruments, allow the working current, such as the measuring current in a measuring system, to pass through such section without any hindrance. These guiding or blocking means enable that current intensity or voltage to arise in any section of the system which is required for the restoration of the endangered contact, by concentrating the effect of the restoring current on that part of the system which contains the contact or contacts which may require restoration.

The intensity of voltage of the restoring current may be controlled by conventional measuring instruments (ammeters and voltmeters) which will also indicate any deterioration of conductivity at the contacts within any section of the system.

In the drawings affixed to this specification and forming part thereof, a number of embodiments of the invention are illustrated diagrammatically by way of example.

In the drawings—

Figure 1:
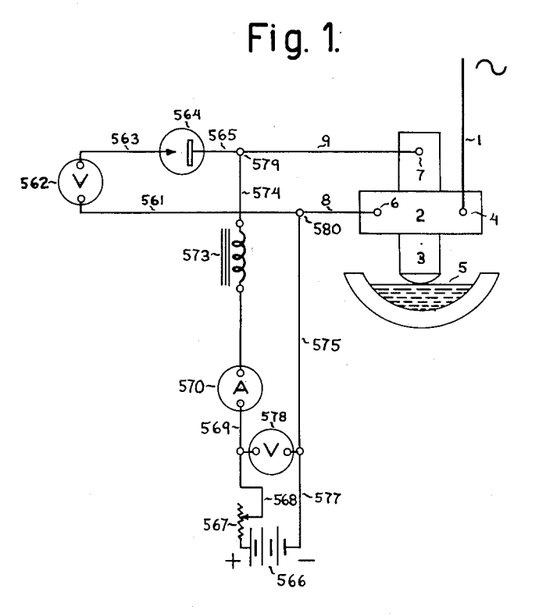
Fig. 1 is a diagram of an A. C. measuring system protected by a D. C. restoring arrangement.

Referring to the drawings and first to Fig. 1, only a voltmeter 562 is shown here as the measuring instrument in the electric system, but it should be understood that it stands here for any type of measuring or indicating instrument adapted for use in such a system. The system further comprises an electrode holder 2 and electrode 3 of an electric arc furnace containing a body 5 of molten metal. The working current or load current is fed to the holder 2 through the wire 1 connected to the point 4. The measuring instrument 562 is provided to indicate any variations of the drop of potential between the holder 2 and its electrode 3. It is connected to the holder at 6, to the electrode at 7. These two "contacts" are subject to the action of the heat, the dust and the gases issuing from the body of metal 5 in the furnace and the conductivity at these points is bound to deteriorate under this action, whereby the indication of changes of the drop of potential by the voltmeter would be rendered faulty.

Restoration of conductivity of these contacts is effected whenever any material deterioration has taken place, by an additional current fed to the system from a current source 566 and flowing through the connection points 6 and/or 7, this additional current having an E. M. F. and intensity such that it will puncture the insulating layer formed between the contacting parts.

In order that this restoration can take place automatically during operation of the system and without any danger to the voltmeter or the like, I provide guiding means which force the restoration current to flow through a predetermined path which avoids the measuring instrument. In the present case, where the current source (battery 566) furnishes direct current, the rectifier (valve) 564 acts as guiding or blocking means for diverting restoration current from the measuring or detecting instrument or other auxiliary device or circuit responsive to electrical conditions at the points 6 and 7. In the circuit comprising the measuring instrument 562 alternating current flows from the connection 6 at the electrode holder 2 through the wires 8 and 561, voltmeter 562, wire 563, rectifier 564, wires 565 and 9 to the connecting point 7 on the electrode 3. The valve 564 as such would allow only one-half wave of the drop of potential to pass through. However, since it is not the absolute value of this drop of potential, but its changes, that is of interest here, the passage of one-half of a wave is all that is required.

At the same time current flows from the positive pole of the source 566 of direct current through the regulating resistance 567, wires 568 and 569, ammeter 570, choke coil 573, wire 574, connection 579, wire 9, connection 7, electrode 3, electrode holder 2, connection 6 of the measuring circuit, wire 8, connection 580, wire 575, and wire 577, back to the negative pole of the current source 566.

The current, being positive at the connection 579, is not capable of passing through the rectifier 564, as this latter is arranged in the circuit, but is forced to take the way through wire 9 and the measuring connection 7 and 6. On applying sufficient amperage and voltage, the current will puncture any insulating layer which may have formed at the points 6 or 7, and will thus restore conductivity automatically, while the measuring system is being traversed by its (alternating) working current. The amperage is regulated by means of the regulating resistance 567. The E. M. F. of the current source 566 may also be made regulatable, if desired.

While the amperage passing through from the protective device is indicated by ammeter 570, the voltage is indicated by voltmeter 578. These two instruments allow of watching the degree of conductivity at the contacts 6 and 7. This is facilitated by the use of a current of an intensity which may amount to hundred times the intensity of the measuring current in the system. If for some reason it should be desirable to obtain exact data regarding the degree of deterioration of conductivity at the contacts, the E. M. F. from the source of restoring current should be chosen as low as not to enable the insulating layer to be punctured, whereupon it should be raised gradually until puncturing occurs. The voltage required to do it can thus be ascertained easily.

Moreover, the successful functioning of the circuit restoration means is very easily checked visually by reliable, simple instruments such as the ammeter 570 and the voltmeter 578, either or both of which might also take the form of automatically operating indicators or alarm devices if automatic check up on the functioning of the circuit restoration is desired.

As shown, the source of restoration current 566 is a simple battery reliable in functioning, and the electromotive force of which depends in no manner upon the maintenance of good contacts in any of its elements. Moreover, if some contact deterioration should take place such as in the connections to the battery, in the connections in the rheostat 567 or in the sliding tap, or in the connections to the ammeter 570, to the choke coil 573, or in the connections to the measuring circuit at 579 and 580, automatic restoration of circuit conductivity at these points is automatically assured by the same means as circuit conductivity is restored, if necessary, throughout the auxiliary circuit to be supervised or to be protected such as at the contacting connection terminals 6 and 7.

It is quite evident that the circuit restoration means illustrated is inexpensive and very simple. For the reasons indicated it has a high degree of reliability, not only in the functioning but in the assurance of the continuance of the supply current. Variations in the circuit contacts in the circuit to be supervised have no effect on the output or voltage of the current source 566. The degree of restoration which is provided such as in the contact at the terminals 6 and 7, for example, is proportional to the need therefor. This happens because the greater the contact deterioration, the greater its resistance and the greater the voltage drop therein, so therefore, the greater the restorative effect of the restorer current from the source 566. Good contacts are thus assured in the auxiliary or measuring circuit including the conductors 8 and 9 and the voltmeter 562.

As shown, the arrangement is employed for supervising so called permanent or fixed contacts. It is not limited to movable or temporary contacts such as might be employed if desired for connecting leads 8 and 9 to the electrodes 2 and 3. Moreover, my circuit restoration system functions effectively even though the contact resistance such as at the terminals 6 and 7 may be very small in comparison with internal battery resistance, current limiting resistance such as in the rheostat 567, the ohmic component of the impedance of the choke coil 563, etc.

The choke coil 573 prevents the indications of the main instrument 562 from being influenced by opposing a high resistance to the alternating current, i. e. to the drop of potential between the electrode and its holder, while to the direct current from the protective device it offers only a comparatively low ohmic resistance. Therefore the protective device may be inserted any length of time without influencing the measurements of the instrument 562.

Any appreciable partial deterioration of any contact in the respective section of the measuring circuit, and more especially of the contacts 6 and 7, will be instantly removed. At the same time the indicating devices in the restoring circuit continually indicate the actual condition of the respective part of the circuit.

If these indicating devices are combined with suitable signalling means, a signal will become perceptible, for instance, visible or audible automatically as soon as one of the measuring contacts has suffered deterioration to such an extent that it could not be restored.

The rectifier 564, as was mentioned above, only allows the passage of a half wave of the alternating voltage to be measured. If it should be desired to afford passage for the entire wave, the rectifier might be replaced by a condenser, which blocks the direct current from the restoring circuit as effectively as the rectifier.

If the working current amperage passing between the electrode 2 and its holder is very high, while the inner resistance between these parts is very low, as is the case with electric furnaces, the choke coil 573 may be dispensed with and the protective device may still be inserted permanently in the circuit without influencing the measuring instrument 562. But also if the inner resistance is high, the choke coil may be dispensed with, if the protective device is actuated only for a short period of time, since then the instrument 562 will also be influenced only during a short period of time. One may also dispense with a regulation of the source of direct current 566.

The voltmeter and ammeter of the restorer may be replaced by an incandescent lamp which, if connected in series with the current source, may serve directly as a limitation resistance and as a crude kind of indicating device for the passage of current and for its amperage. Another lamp may crudely indicate the potential.

The above described restoring device may be used also if the working current does not flow in the network.

Figure 2:
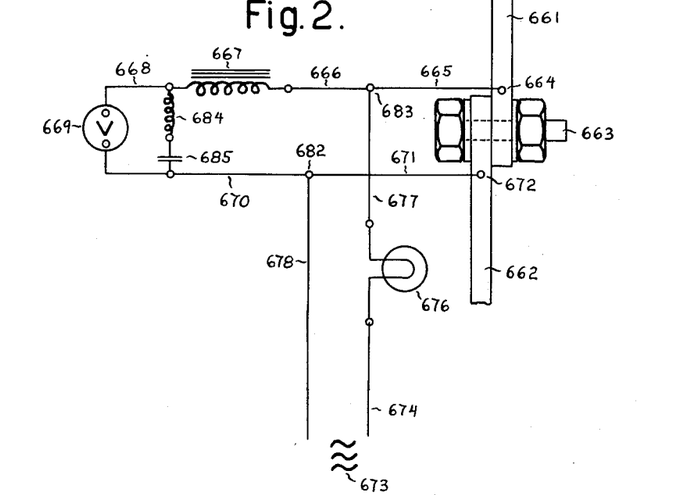
Fig. 2 is a diagram of a similar system protected by a high frequency A. C. restoring arrangement.

Fig. 2 illustrates the combination of the restoring device with an alternating current system, however with a somewhat different arrangement of the parts. Nevertheless, the numerous advantages and accomplishments such as discussed in connection with the arrangement illustrated in Fig. 1 are also achieved in the arrangement illustrated in this figure and in the other embodiments of my invention described herein.

Here 661, 662 are bus bars of an alternating current system of normal periodicity. The two bars are fixed to each other by means of the screw bolt 663. The drop of potential arising between the two bars during operation of the system is measured by means of the voltmeter 669. The protective device is fed from the high frequency alternating current source 673. Since the protective device can remain connected indefinitely, a guiding means such as the choke coil 667 must be provided for the measuring instrument 669.

When measuring the drop of potential, current flows from the connection 664 on the bus bar 661 through wires 665, 666, choke coil 667, wire 668, voltmeter 669, wires 670 and 671, to the connection 672 on the bus bar 662.

Restorer current flows from the high frequency alternating current source 673 through wire 674, bulb 676, wire 677, wire 665, connection 664, bus bars 661 and 662, connection 672, wire 671, connection 682, wire 678, back to current source 673.

The frequency of this current source is chosen so many times higher than the frequency of the network that the choke coil 667 allows the measuring current of normal periodicity, which flows from the bus bars to the measuring instrument 669, to pass through almost without hindrance. On the other hand, the choke coil opposes so high a resistance to the high frequency current from the restoring device that the measuring instrument 669 is not noticeably influenced thereby.

If it is desired to altogether eliminate the influence exerted by the high frequency alternating current source, an inductive resistance 684 and condenser 685 are inserted between the wires 668 and 670, these devices being so tuned as to offer to the passage of the high frequency alternating current a short circuit path, and this current is thus hindered altogether from reaching the instrument 669. Alternating current of normal periodicity is practically not influenced thereby.

As shown in the drawing, an incandescent lamp 676 here serves as series resistance and crude indicating device. Here again the maximum amperage capable of passing through the filament must be sufficient to restore a partially deteriorated contact.

The lamp 676 may again be replaced by any other resistance which allows so much current to pass through from the protective device that the contacts can be restored.

Figure 3:
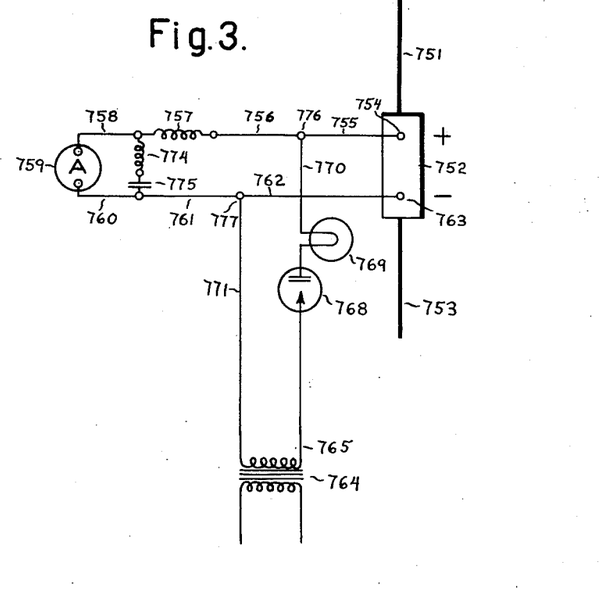
Fig. 3 illustrates the use of a precision-moving-coil-ammeter connected to a shunt in a direct current system.

Fig. 3 shows the use of the restoring circuit in combination with a direct current measuring system which is here represented by a precision ammeter 759 with a shunt 752. The restoring circuit is fed by the source of alternating current and transformer 764, the measuring system being protected in the first place by the choke coil 757. 752 is a shunt with lead 751 and derivation 753. The polarity is indicated in the drawing with the current flowing in downward direction.

The measuring current from shunt 752 to the measuring instrument 759 flows from the positive connection 754 through wires 755, 756, choke coil 757, wire 758, ammeter 759, wires 760, 761, 762 to the negative connection at the shunt 763. Restoration current flows from the transformer 764 through wire 765, rectifier 768, lamp 769, wire 770, connection 776, wire 755, connection 754, shunt 752, connection 763, wire 762, connection 777, wire 771, back to the transformer 764.

The choke coil 757 is so chosen that it prevents the precision moving-coil ammeter 759 from being influenced by the alternating current from the restoring circuit. The ohmic resistance of the coil is, however, so low that the measuring current can pass through practically unhindered.

Instead of alternating current of normal periodicity I prefer high frequency current for the protective device. In that case the dimensions of the choke coil become substantially smaller and its ohmic resistance becomes less also.

By correspondingly chosing the frequency I can provide that the influence exerted by the ohmic resistance of the choke coil can practically be neglected altogether.

In order to obtain an absolutely correct reading at the moving-coil ammeter 759, the ohmic resistance of the choke coil 757 should be considered in the production of the graduation of the ammeter.

In order to altogether eliminate any influence which might be exerted on the ammeter 759 by the alternating current from the restoring device, an inductive resistance 774 and condenser 775 may be inserted between the wires 758 and 760, similarly as described with reference to Fig. 2, and the coil and condenser may be so timed as to act as short-circuit path with respect to the alternating current from the restoring device.

If the rectifier 768 is provided, only one-half wave can be made to pass through from the restoring device without hindering its protective action. However, the rectifier is provided for preventing the device from forming another current branch, parallel to the ammeter 759, whereby the reading at this instrument might be detrimentally influenced. Thus the restoring device can be kept in the circuit for any length of time.

Even if the rectifier 768 is omitted, the protective device may remain inserted, as explained with reference to Fig. 1. In the arrangement shown in Fig. 3, which comprises a direct current shunt, there flows almost always a high working current, while the resistance offered by the shunt is comparatively very low, and therefore the restoring device can also be used without the rectifier 768. In that case, of course, a full wave of alternating current will pass through from the restoring device. The rectifier may also be dispensed with in a case where deterioration of the connections 763 and 754 is likely to occur seldom only and the restoring device is cut in only for a short period of time, and that even if very little working current should pass through and the inner resistance at the point of measurement should be very high.

In many cases the inductive resistance 774 and condenser 775 may be omitted also. During longer operating periods it is sometimes not important that the ammeter 759 does not indicate precisely during a short period of time only, i. e. at the moment when the alternating current potential rises for a short interval, due to the fact that a substantial deterioration of a measuring contact has occurred temporarily.

Figure 4:
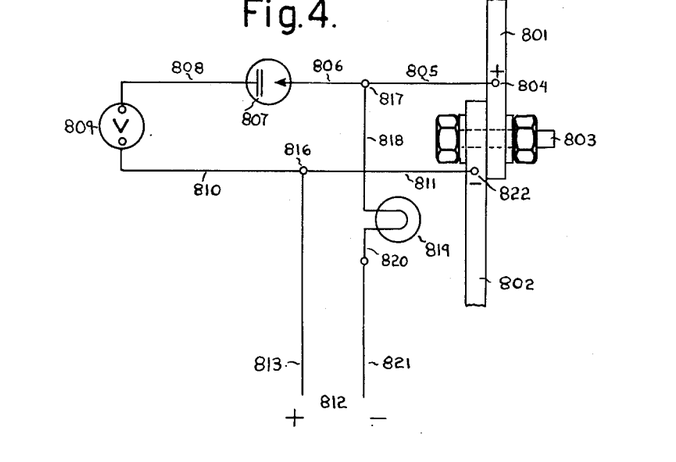
Fig. 4 shows a similar arrangement, in which direct current is used for restoring conductivity.

Fig. 4 illustrates a direct current installation in combination with the restoring device which is here fed with direct current also.

The drop of potential between two bus bars 801, 802 is measured by the voltmeter 809. 804 is the point at which the voltmeter is connected with the bar 801, while the other end of the measuring circuit is connected to bar 802 at 822.

Connection 804 is the positive, 822 the negative pole. The current flows from 804 through wires 806 and 805, rectifier 807, wire 808, voltmeter 809, wires 810, 811 to the connection 822. Direct current from the simple restoring device flows from the positive pole of the source of direct current 812 through wire 813, wire 815, connection 816, wire 811, connection 822, bus bars 801, 802, connection 804, wire 805, connection 817, wire 818, lamp 819, wire 820, and wire 821 back to the negative pole of the current source.

When the restoring device is actuated, the connection 816 always becomes positive, 817 negative. Owing to the arrangement of the rectifier 807 the current from the protective device is not able to pass through voltmeter 809, but is forced to flow through connection 822 and 804 so that the instrument is protected against the action of the restoring current source.

The lamp can again be replaced by a resistance which allows the required amperage to pass through, and in this case no controller for this amperage need be provided, but it would still be possible to ascertain whether the restoring device has restored the contact by watching the deflections of the voltmeter 809. Since all larger installations include an ammeter and, with the load in the circuit remaining constant, if a greater deflection occurs in the voltmeter 809 it will be safe to say that some contact has been restored in the measuring circuit.

Figures 5, 9:
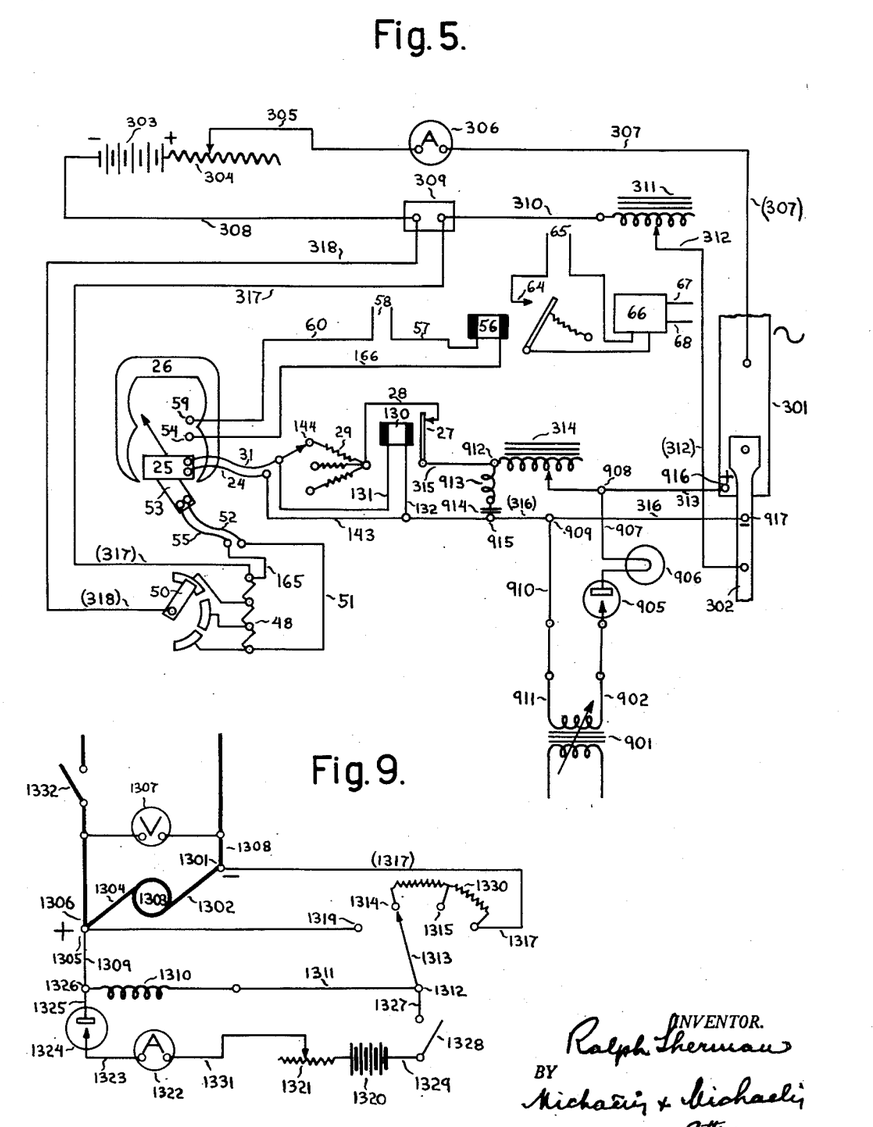
Fig. 5 illustrates the combination of the restoring device with a measuring system which serves for supervising part of an alternating current system, this measuring system being fed with separate direct current.
Fig. 9 illustrates the application of the restoring device to the excitation of a direct current dynamo.

Fig. 5 shows the application of the restoring device in an alternating current installation with a measuring circuit fed with separate direct current. Here guiding means are required to protect the main measuring instrument against any influence exercised by the alternating current flowing in the system and by alternating current coming from the restoring device, which may be fed from a source of alternating current of the same periodicity as the main system.

Here 301, 302 are the bus bars of the system and 315 and 316 are the measuring wires leading to the measuring instrument proper.

The measuring system uses separate direct current from the source (battery) 303, solely to measure the voltage drop between the two bus bars. This direct current is regulated by the resistance 304. The amperage is supervised by the ammeter 306.

The restoring device is fed with alternating current from the source 901. The current flows from 901 through wire 902, rectifier 905, lamp 906, wire 907, connection 908 and wire 313 to the connection 916 and through bus bars 301 and 302, connection 917 of the measuring circuit, wire 316, connection 909, wire 910, and wire 911 back to the alternating current source 901. In the section of the measuring circuit leading to the instrument a regulatable choke coil 314 is inserted which serves for reducing to a neglectable minimum the passage of alternating current from the network and from the protective device.

Between the wires 315, 316 leading to the voltage coil of instrument 26 an inductive resistance 913 and condenser 914 is inserted at 912 and 915, respectively, these devices being so tuned that they offer a short-circuit path to the alternating current which might arrive from the network or from the restoring device.

If one of the connecting contacts, for instance, 916 or 917, should become deteriorated, the restoring device will generate a materially higher potential than exists normally in consequence of the drop of potential between the two bus bars. The short-circuit path mentioned above constitutes another protective means for the voltage coil of the measuring instrument. It will be useful also in the case where the contact between the bars deteriorates materially, thereby causing a high potential to develop at the connections 916, 917 of the measuring circuit.

The short-circuit path formed by the inductive resistance 913 and condenser 914 can be omitted in all cases where deterioration of contacts is not likely to occur frequently, or where no particularly accurate measuring results are required.

Here also the new device forms a parallel branch to the working current. In order that the indications of the main measuring instrument be not influenced thereby, the rectifier 905 is inserted in the restoring device. It prevents the passage of direct current from the measuring circuit through this device. This rectifier 905 will only allow one-half wave of the alternating current from the restoring device to pass through, however its action is not impaired thereby, since its voltage may, if desired, be increased in order to make up for the loss of the other half of each wave.

The rectifier 905 may be omitted if the current from the source 303, which is used for measuring separate current, is comparatively high, while the resistance between the bus bars 301, 302 is normally very low. However, even in the case where these last conditions are not met, the rectifier 905 can be omitted, provided the restoring device is actuated only for a short period of time or if highest accuracy of measurement in the main system is not a requirement.

When comparing Fig. 5 with Fig. 3, one sees that the arrangement of the restoring device as a whole and the means for protecting the measuring instruments are identical in both figures. This is due to the fact that, when combining the restoring device with apparatus for measuring the conditions of contact with separate current, the kind of current used for the device should preferably be the same as that flowing in the network. This involves the advantage that the particular means for protecting the principal measuring instrument from the current in the network may also be used to protect it from the current in the restoring device.

The practical consequence is that when measuring with separate current, the restoring device may and should be of a kind adapted to be operated with that kind of current (direct or alternating) which actuates the main measuring instrument.

As regards the function of the lamp 906, the possibility of using precision measuring apparatus or the replacement of measuring devices by simple series resistance, reference is had to the explanation given above with respect to these matters.

If for some reason an alternating current is used in the restoring device with a periodicity differing from that of the working current, the regulatable choke coil 314 should be capable from the outset of handling this lower periodicity, and in that case it may sometimes be useful to provide for another set of inductive resistance and condenser like 913 and 914, tuned as short-circuit path for the periodicity from the restoring device.

Figure 6:
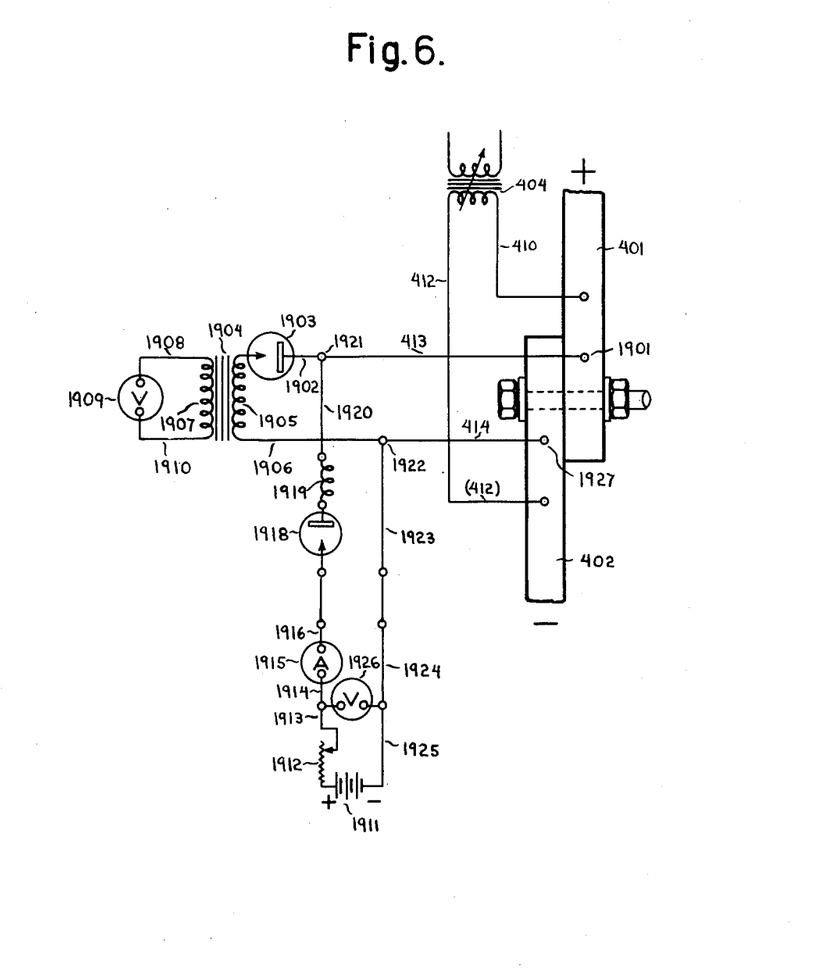
Fig. 6 shows a combination of the restoring device with a measuring system which is fed with separate alternating current and serves for supervising part of a direct current system.

Fig. 6 illustrates the use of the restoring device in the measuring circuit in connection with a direct current system in which alternating current is used for measuring purposes.

Similarly as in Fig. 5, the same kind of current source, i. e., a direct current source 1911, is used as in the main system, the means protecting the measuring device from the working current and from the current in the restoring device being a rectifier operating with or without transformers.

401 and 402 are the direct current bus bars in the network. The measuring system serving for measuring and/or indicating all changes of resistance between the two bars is connected at 1901 and 1927, respectively. Measuring is done by creating a drop of alternating current potential by applying separate alternating current from the transformer 404. The measuring current flows from connection 1901 on bus bar 401, wire 413, rectifier 1903, the primary winding of transformer 1905, wires 1906 and 414 to the connection 1927 on bus bar 402. This current induces with the aid of the voltage transformer 1904 the voltage in the secondary winding 1907 of the transformer and this voltage flows through wire 1908, voltmeter 1909 and wire 1910 and back to the secondary winding.

The rectifier 1903 allows only one-half wave to pass through to the measuring apparatus proper. However, this is no obstacle, since it is only a change in the resistance which shall be measured, and not its absolute value.

The current flows from the battery 1911 of the restoring device through the regulating resistance 1912, wires 1913 and 1914, ammeter 1915, wire 1916, rectifier 1918, choke coil 1919, wire 1920, connection 1921, wire 413, connection 1901, through bus bars 401 and 402, connection 1927, wire 414, connection 1922, wire 1923, and wires 1924, 1925 back to direct current battery 1911. The ammeter 1915 and voltmeter 1926 serve for watching the amperage and voltage present in the restoring device.

Between the connections 1901 and 1927 there acts the drop of potential of the direct current circuit which arises between the bus bars. Connection 1901 is positive, connection 1927 negative. This direct current cannot pass through to the secondary side of the transformer 1909 and to the instrument 1909. The second protective means here provided is the rectifier 1903 which also would prevent the passage of the direct current.

One might use this rectifier alone to protect the instruments and connect the voltmeter 1909 directly to the measuring current from the bus bars, dispensing altogether with the voltage transformer 1904. With the use of the restoring device the connection 1921 becomes positive and the current passage through instrument 1909 is then blocked by the rectifier 1903 similarly as with respect to the current passage caused by the direct current voltage drop in the network.

Since the restoring device offers a parallel branch to an alternating current voltage drop arriving in the measuring circuit, it is provided with a choke coil 1919 which prevents any influencing of the measurement at 1909.

As explained with reference to Fig. 1, the restoring device can also be used for any length of time without the choke coil 1919 if a comparatively high current is supplied from the alternating current source 404 and if the resistance between the two bus bars is normally comparatively low.

The rectifier 1918 which protects the measuring instruments of the restoring device from the action of the voltage drop between the bus bars may be dispensed with, if the amperage from the protective device is many times higher than the current which might be generated in the restoring device by the direct current voltage drop between the bars.

In Fig. 6 alternating current is used for measuring purposes, while the network is supplied with direct current. Therefore, according to Fig. 5 that arrangement should here be chosen, which also uses alternating current for measuring and direct current in the restoring device. This arrangement was shown in Fig. 1. It is obtained by omitting in Fig. 6 the voltage transformer 1904 and the rectifier 1918.

Figure 7:
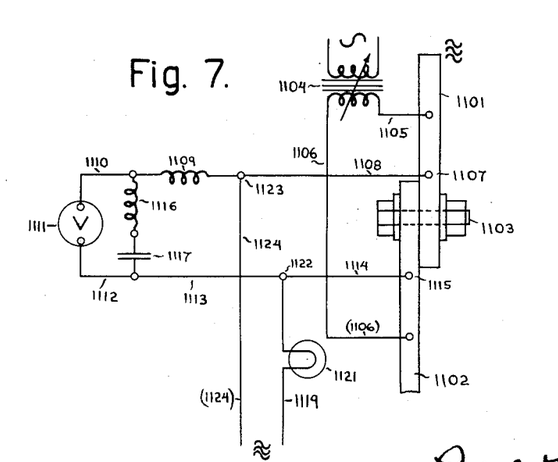
Fig. 7 is a diagram illustrating the combination of the restoring device with a measuring system which is fed with separate alternating current and serves for supervising a high frequency alternating current system.

Fig. 7 illustrates another combination of the restoring device with a measuring system employing separate current, in which the changes of resistance arising between two bus bars are measured. 1101 and 1102 are bus bars inserted in a high frequency alternating current system. Measuring is effected with alternating current of low periodicity supplied by the transformer 1104 which flows through wire 1105, bars 1101, 1102 and wire 1106 back to 1104. 1111 is the instrument for measuring the voltage drop between the bars. The current actuating this instrument flows from the connection 1107 on bar 1101 through wire 1108, choke coil 1109, wire 1110, voltmeter 1111 and wires 1112, 1113, 1114 to the connection 1115 on bar 1102.

The ratio of periodicity of the two alternating currents is so selected and the choke coil 1109 is so chosen that the voltage drop of the high frequency alternating current in the network is prevented almost altogether from passing through the choke coil, while the voltage drop created by the source of separate current 1104 with low periodicity has to overcome only an extremely low inductive resistance. Since it is not the absolute value of the voltage drop which shall here be measured, but only any changes of this resistance, the choke coil does not hinder the desired measurement.

If it is desired to altogether exclude any influence exerted by the high frequency alternating current, an inductive resistance 1116 and condenser 1117 can be provided, as in arrangements discussed before, which are connected behind the choke coil 1109 in parallel to the measuring instrument 1111. The inductive resistance 1116 and condenser 1117 are again tuned in such a manner as to form a short-circuit path for the high frequency current. This current feeds the restoring device at the same periodicity as in the network.

In all other respects the general arrangement resembles the one shown in Fig. 2.

Figure 8:
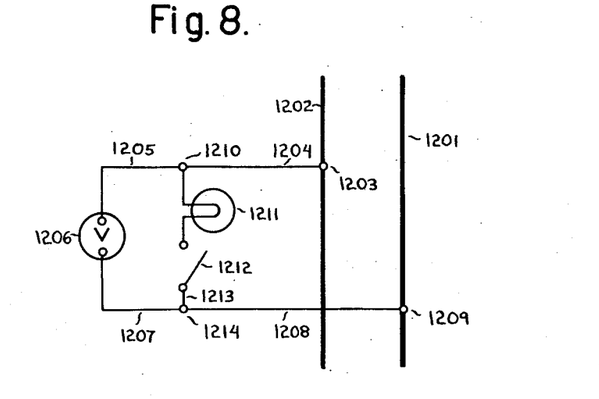
Fig. 8 illustrates the combination of the restoring device with a measuring system connected to the network voltage; however, here the restoring device, in contrast to all the other arrangements, operates without any separate source of current, the network itself forming its current source.

Fig. 8 illustrates another system protected by a restoring device according to this invention. In contrast to all the systems described above it lacks any separate source of current, thus rendering unnecessary any special protection for the main measuring instrument, and still the restoring device can function permanently without any interruption.

Here 1201 and 1202 are bus bars of a power installation operating, for instance, with 110 volt, 1209 being the voltage measuring instrument.

The current flows from the connection 1203 on bus bar 1202 through the wires 1204 and 1205, voltmeter 1206 and wires 1207, 1208 to the connection 1209 on bus bar 1201. The voltage of the electrical circuit in which this voltmeter is connected may be sufficient in the majority of cases to prevent a partial deterioration of the contact at 1203 or 1209. However, the current flowing normally through the voltmeter is so small that, in spite of the presence of a voltage sufficient as a rule for the restorer effect, a satisfactory restoration or maintenance of the conductivity in the network cannot take place. To guarantee this, the following protective device is provided.

The current flows from the connection 1210 between the wires 1204 and 1205 through lamp 1211, switch 1212, wire 1213 to the connection 1214 between the wires 1207 and 1208. The lamp 1211 should be so chosen that the current normally passing through it would be adapted to effect restoration of the contact. If now switch 1212 is closed, an additional current will flow through the connections 1203 and 1209 with a voltage of 110 volt and a current intensity sufficient for restoration of the deteriorated contact. Thus here restoration is effected without the aid of a separate current source.

If the voltmeter 1206 indicates a lower than normal voltage, it will be easy, when connecting the protective device, to ascertain whether the working voltage really is lower than usual or whether an appreciable deterioration has occurred in the measuring circuit. If this is the case, the contact will be restored at once when the protective device is cut in, and this will become visible in the voltmeter 1206 in the form of a rise of voltage or, if for some particular reason no restoration could take place, the voltage indicated by the voltmeter will drop further, since the current consumption of the protective device, owing to lack of contact in the measuring circuit, will bring about an additional loss of voltage and the lamp 1211 will light up very little.

The arrangements here described can be used in all cases where the voltage of the network is adapted for the restoration of conductivity, for instance, in all power installations operating with 110 or 220 volt, but a restoring device of this kind may be used sometimes also at far lower voltages. For instance, at 10 or 20 volt. Obviously with this arrangement no interruption is necessary in the measuring circuit.

The same restoring device is adapted for use in connection with any instrument which uses network voltage of sufficient strength for measuring purposes, as is the case for instance with wattmeters and the like, in which the voltage drop may rise under the action of heat or concussion or from other causes.

The restoring device should be connected as closely as possible to the principal measuring instrument in order to thus cover the greatest possible part of the measuring system.

Here also, instead of a lamp such as 1211, a series resistance which may be regulatable, and an ammeter may be used. In the simplest type of installation the lamp may be replaced by an ordinary resistance, i. e. some kind of current consuming device the ampere consumption of which is sufficient to restore the conductivity of contacts that had appreciably deteriorated.

Fig. 9 illustrates the application of the protective device to the excitation of a direct current dynamo in the case where self-excitation on starting the dynamo should not take place. It is well known that D. C. dynamos sometimes do not excite because they cannot develop the necessary voltage by themselves. These failures usually cause considerable loss of time and require expert handling. They are in most cases due to a deterioration of a contact in the field circuit which raises the resistance considerably.

The restoring device enables me to apply to the field contacts a voltage which may be 30 to 50 times higher than the highest remanence voltage and which will at once restore conductivity and cause starting of the dynamo without the operator leaving his place at the switchboard.

In the diagram of Fig. 9, 1303 is the armature of the D. C. dynamo which supplies current through the bus bars 1306 and 1308, 1332 being a circuit breaker connected with bus bar 1306. Between the bus bars the voltmeter 1307 is connected which indicates the voltage generated by the dynamo. For the sake of simplicity the dynamo is here shown only with an ordinary shunt field 1310. The voltage is regulated by means of the lever 1313 of a resistance 1330. The remanence voltage induced in the armature by the permanent magnetism of the field being very low, often as little as 1-3 volts, a heavy oxid layer formed on a contact will not be punctured. In such a case the switch 1328 of the protective device is closed with the regulating lever 1313 on contact 1314 which throws in the highest resistance of the field rheostat 1330. Since the total ohmic resistance of this rheostat is at least one and one-half or twice as great as the ohmic resistance of the shunt field, it causes only small additional current to flow through the armature. The insertion of the protective device at this position of the lever 1313, therefore, offers the possibility of producing with a comparatively low total current a sufficiently high voltage drop between the terminals 1326 and 1327 of the shunt field. The amount of this voltage drop can be regulated to a certain degree by means of the resistance 1321. This offers the possibility of restoring conductivity in the somewhat deteriorated contacts in the field circuit between the terminals 1326 and 1327.

A certain proportion of the current also flows from the regulating lever 1313 and contact 1314 through the armature 1303 which renders it possible to restore also in this circuit any contacts which may have deteriorated.

At the same time the current flowing through the shunt field increases the field magnetism. The magnetization curve at the beginning follows a very steep course. This makes it possible to produce a very high voltage in the armature with a comparatively very low voltage applied at the field.

It is a great advantage that in the arrangement here described every voltage induced in the armature acts at once on the entire field circuit whereby the effect brought about by the restoring device is greatly increased. The voltage induced in the armature, therefore, generates at once an increased current flow through the dynamo brushes 1302, 1304, the lever 1313 of regulating resistance and the shunt winding 1310, as soon as the induced voltage in the armature exceeds the voltage of the restoring device. This causes an amplification of the field, which in turn brings about a rise of the voltage induced in the armature, and this process continues until the dynamo has developed its full voltage.

Thus the arrangement described above renders it possible to obtain with a current source of low voltage a more speedy excitation than with a very high voltage according to the method of artificial excitation as hitherto used. Provided the circuit is not interrupted directly and no defect has developed in the dynamo, excitation is sure to be effected, since all contacts traversed by the field current in the respective position of the field rheostat are subjected to the action of the protective device.

In the position of the rectifier 1324 shown in the drawing, the current flowing from the positive pole 1305 of the dynamo cannot pass through the restoring device, but is forced to pass through the shunt winding 1310. The rectifier 1324 allows the current from the restoring device to pass through, but blocks the path from the dynamo through the protective device. It thus acts as a guiding or blocking means.

When the voltage generated by the dynamo begins to rise, the current to be supplied by the restoring device drops gradually and stops altogether as soon as the dynamo produces a higher voltage than the restoring device. Therefore, when the voltmeter 1307 shows that excitation of the dynamo has started, the rheostat lever 1313 can be shifted gradually to lower resistance and the voltage of the dynamo is then raised as required.

The rectifier 1324 might be replaced by a reverse current cut-out or an excess voltage relay or by some other apparatus capable of interrupting the current flowing through the restoring device as soon as the dynamo voltage exceeds that supplied by this device.

The D. C. source of current 1320 feeding the restoring device may be replaced by an A. C. source. In the latter case the rectifier 1324 would not only act as a protection against the armature current, but also as a rectifier for the alternating current and would thus enable restoration of the contacts to take place in exactly the same manner. In that case the rectifier 1324 might be arranged as a double-bridge rectifier in order to utilize the entire wave of the alternating current.

Whenever a particularly simple protective device is desired, the rectifier or other protective means may be omitted alogether and a D. C. source may be used, the current of which is limited by a corresponding resistance. In that case the restoring device should be cut in only for a few seconds, being cut out as soon as the voltmeter 1307 indicates that the voltage rises. Preferably the lever switch 1328 should, in this case, be acted upon by a quick-acting return spring or a time relay to reopen the switch directly after it was closed. Preferably also overload relays or fuses should be provided in order to prevent too high a current from flowing from the dynamo to the restoring device when the cutting out should not take place in time. In every case the dynamo, after excitation by the restoring device, may remain in operation since no changes of connection are required.

The restoring device will prove of particular value in connection with low voltage dynamos serving for electroplating which operate with about 6 to 10 volts only. The remanence voltage here amounts only to fractions of a volt. Since in these establishments the air always contains traces of acid, the contacts are likely to be oxidized and an oxid film, in view of the low starting voltage, may cause considerable trouble.

The restoring device may also be used with advantage in connection with the D. C. exciting dynamos of synchronous machines operating either as motors or as A. C. generators.

Figure 10:
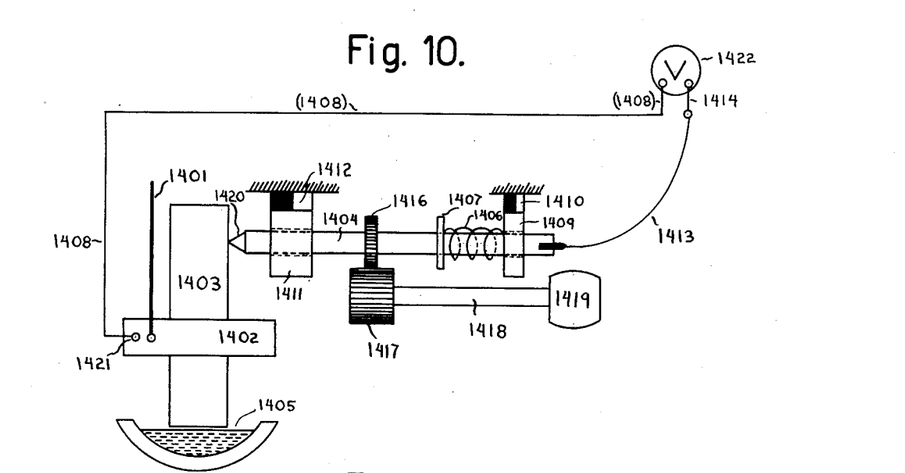
Fig. 10 shows the protection of electric contacts partly by mechanical means.

Fig. 10 illustrates the protection of the contacts with the aid of partly mechanical means. For the sake of clearness mechanical protection of contacts is shown only with reference to one contact point, between the electrode 1403 and contact spindle 1404, but obviously such protection might also be provided at all other contact points. 1401 is a current supply to the electrode holder 1402 from which the current flows through the electrode 1403 and the body 1405 of molten metal. The drop of potential between the electrode holder and the electrode is measured with the aid of a wire 1408 connected to the electrode holder 1402 at 1421 and leading to the voltmeter 1422. The other measuring wire is here connected to the electrode 1403 by means of a screw spindle 1404 with a point 1420. The spindle is supported in two bearings 1409 and 1411, with insulating material 1410 and 1412, respectively, holding the bearings in place. At the spindle and opposite the point 1420, the measuring wire 1413 is fixed by soldering or welding, this wire leading through wire 1414 to the other pole of the instrument 1422. The point 1420 of the spindle 1404 is preferably made of a material which can withstand the action of heat and smoke gases. Nevertheless, under the conditions existing in an electric furnace the point will after some time be subject to oxidation. During operation of the furnace dust settles on the electrode and, therefore, the contact between the point 1420 and the electrode may be poor from the beginning or may deteriorate considerably during operation.

In order to counteract this, the spindle 1404 is forced with considerable pressure by a spring 1406, acting on the collar 1407 against the bearing 1409, and its point 1420 is thus forced against the electrode 1403. A motor 1419 drives by means of a spindle 1418 a gear 1417 meshing with a gear 1416 on spindle 1404. The motor is controlled by a switching device (not shown) of well known construction, for instance, in combination with a worm gear which causes it to make short turns alternately to the right and to the left whereby the spindle 1404 is constantly reversed also. Owing to the combined axial and alternating circumferential movements of the spindle, sliding friction is created between the point 1420 and the electrode. This sliding friction keeps the contacting surfaces clean by loosening any oxid layers which may form. The pressure exerted by the spring could be such that the point 1420 gradually enters the electrode material, whereby a good contact is ensured.

The wire 1413 may also be connected to the motor spindle by means of a collector brush sliding on a collecting ring (not shown) mounted on, and connected to, the spindle 1404.

The spring 1406 might be arranged in some other place and may be assisted, or replaced, by any other pressure-producing medium, including for instance a solenoid. The pressure exerted on the contact point may be permanent or intermittent. This device can be used not only with carbon electrodes, but also with conductive bodies or some other material, and more especially with metal.

In any case provision must be made for a relative shifting under pressure of the contacting surfaces occurring permanently or at intervals.

The described moving of a contacting part may, of course, be effected by any suitable means.

Figure 11:
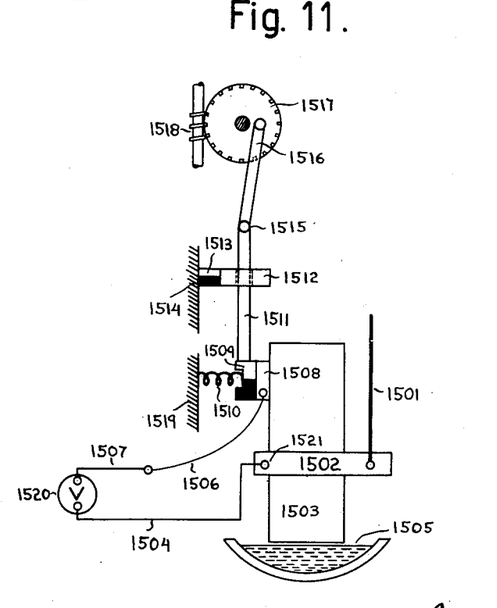
Fig. 11 illustrates another arrangement, in which the mechanical parts slide on the contact surface.

Fig. 11 illustrates the protection of contact with the aid of mechanical means producing a sliding movement on the contact surfaces.

Here 1501 indicates the current feed to the electrode holder 1502, the electrode 1503 and the body 1505 of molten metal.

The drop of potential between the holder and the electrode is indicated by the voltmeter 1520 which is connected to the holder 1502 by a wire 1504. The other terminal of the voltmeter is connected to the electrode 1503 by wire 1507, pliable wire 1506 and contact brush 1508, to which wire 1506 may be welded. This brush is forced against the electrode by a spring 1510 acting on the brush through an insulating piece 1509. Since, in spite of the pressure exerted on the brush, oxidation of the contact surface may be caused by the heat or the action of gases, I provide for reciprocatory sliding movement of the brush by means of a driving mechanism comprising the worm gear 1518, 1517, an eccentric 1522 on the gear, a rod 1516, link bolt 1515 and link 1511 extending through a guide 1512 fixed at 1514 by means of an insulating piece 1513. The brush reciprocated by this mechanism, being acted upon by the spring 510, creates sliding friction on the surface of the electrode 1503 whereby any oxide layer and dust deposited on this surface is removed and good conductivity secured.

Instead of a metal brush, a carbon brush may be used, more especially when the conductor is made of metal, whereby any appreciable wear on the contact surface is avoided. Of course, the carbon brush, when moving, may follow simultaneously any other path, for instance, a circular or elliptic one.

Also in Fig. 11, for the sake of clearness, mechanical means for protecting contacts are shown only at one point of contact. In cases where the measuring contact is exposed to particularly strong injurious action, both kinds of restoring devices, mechanical and electrical, may be combined. If in certain cases it should appear desirable to ascertain whether a material deterioration has occurred, the same restoring arrangement can be applied, however the restoration voltage should then be so low at the start that a puncturing to restore conductivity cannot be obtained. The voltage is then raised gradually and by watching both the voltage and the amperage one can find out whether an insulating layer has been punctured. The value of the voltage required will allow the degree of deterioration to be ascertained.

In order to facilitate reading the instruments, they may be provided with a plurality of measuring ranges and/or amplifiers may be used. The restoring device may also be combined with a signalling device which will give a warning in case the deterioration has proceeded to a point where no improvement is possible any more. Then the condition of the contacts can be watched constantly. The restoring effect is obtained automatically while the measuring system is in full operation.

Whenever no supervision of the contacts is required, the restoring device can be simplified materially. For instance, the means for regulating the voltage may be dispensed with and the measuring instruments may be much simpler or may even be replaced by incandescent bulbs.

While in the foregoing only combinations of the restoring device with measuring systems of various kinds has been described, it will be obvious that it will be of equal use in combination with any other kind of electrical system operating with low amperages and voltages, for instance, signalling or checking systems. Also rotary contacts may be supervised and kept in a high state of conductivity by its application.

When the deterioration of the conductivity in contacts exceeds a certain limit, the restoring current may give rise to very high voltages which might injure the guiding or blocking devices. This may be prevented by the use of a conventional excess voltage protection switch.

The rectifiers, choke coils, etc., serving as guiding or blocking means may, of course, be replaced by any other devices capable of allowing the restoring current to pass through the section to be protected of the system, but counteracting its injurious action on other sections. Even electronic valves may serve the purpose if they are so arranged as to protect the measuring instrument against the action of excess voltage. This may be used, in a well known manner, for creating a short circuit path and/or abolishing the excess voltage created by the restoring device.

It may be well to point out also the utility of a restoring device according to the invention, if used in connection with measuring methods serving to supervise rivet connections, welding joints and screw connections during or after manufacture. Such methods operate with separate current which passes through the contacting paths and indicate changes of the voltage drop. They were hitherto not adapted for use as testing methods during operation of a machine or engine because, if the contact in the measuring circuit should deteriorate or open up altogether, the entire measuring system would cease to act. Here also a restoring device will enable the correct functioning of such a system to be maintained permanently. Important joints in steam engines, Diesel engines, airplane structures and the like may thus be supervised reliably through an indefinite period of time.

Various changes may be made in the structural combinations of means and in the operation of the devices hereabove described without departing from the spirit of the invention or sacrificing the advantages thereof.

I claim:

1. In combination with a detecting instrument having leads adapted to be connected to points in an electrical system under load for response to electrical conditions at such points, such leads and connections including contacts subject to formation of layers of low conductivity incapable of being broken down by voltages less than a predetermined value safely withstood by such instrument, a continuously acting source of restoration current having a voltage continuously exceeding such predetermined break-down value, said source of restoration amount providing current of a different character from that of said electrical system, conductors connecting said current source with said leads and circuit elements having substantially different impedance with respect to the character of current of the said electrical system from the impedance with respect to the character of the restoration current for diverting restoration current from the instrument.

2. In combination a voltage-responsive instrument having leads for connecting such instrument to points in an electrical system under load for rendering the instrument responsive to electrical connections between such points of the electrical system, a continuously acting source of restoration current, conductors connecting said restoration current source to said leads, and circuit elements independent of the instrument for diverting restoration current from said instrument, said leads and connections therefor to said points in said electrical system being liable to include contacts subject to formation of nonconductive layers incapable of being broken down by voltages less than a predetermined value safely withstood by such instrument, said restoration current source having a voltage continuously exceeding such predetermined break-down voltage, the character of the current supplied by the current restoring source differing from the character of the current supplied to said leads from said connecting points for affecting said instrument to facilitate the action of said current-diverting circuit elements.

3. In combination with an auxiliary circuit having leads adapted to be connected to points in an electrical system under load for response to electrical conditions at such points, such leads and connections including contacts subject to formation of non-conductive layers incapable of being broken down by voltages less than a predetermined value safely withstood by such auxiliary circuit, a continuously energized source of restoration current having a voltage exceeding such predetermined break-down value and being free from contacts not transversed by such restoration current, conductors connecting said current source with said leads, and circuit elements independent of said auxiliary circuit for diverting restoration current from the auxiliary circuit.

4. In combination with an auxiliary circuit having leads adapted to be connected to points in an electrical system under load for response to electrical conditions at such points, such leads and connections including contacts subject to formation of layers of low conductivity incapable of being broken down by voltages less than a predetermined value safely withstood by such auxiliary circuit, a continuously energized source of restoration current having a voltage exceeding such predetermined break-down value, conductors connecting said current source with said leads, a current continuity indicator in series with said leads, and circuit elements independent of said auxiliary circuit for diverting restoration current from the auxiliary circuit.

5. In combination a generator having output voltage terminals, a field winding with leads including contacts subject to formation of layers of low conductivity incapable of being broken down by the voltage of residual magnetism of said generator when it is started, said leads connecting such winding to said terminals, a direct-current source of restoration current adapted to be connected across said field winding for energizing said field and increasing the voltage of said generator sufficiently to break down such defective contacts, and a polarity-responsive circuit element for interrupting current opposing the voltage of said restoration-current source.

6. In combination an electrical system adapted to carry a load current, an auxiliary circuit associated therewith having leads and connections including contacts subject to formation of layers of low conductivity incapable of being broken down by voltages small in comparison with normal system voltage, and a continuously acting source of restoration current having connections for causing supply of current to said auxiliary circuit for raising the voltage in such low-conductivity layers to break down value.

7. In combination with an auxiliary circuit having leads adapted to be connected to points in an electrical system under load for response to electrical conditions at such points, such leads and connections including contacts subject to formation of layers of low conductivity and being incapable of being broken down by voltages less than a predetermined value safely withstood by such auxiliary circuit, a source of restoration current having a voltage exceeding such predetermined break down value, conductors connecting said current source with said leads, said source of restoration current having only such contacts as are included within the circuit of said conductors, whereby the reliability and continuity of the restoration current source itself is assured by the operation thereof, and a circuit element in series with said current source for diverting extraneous current from the auxiliary circuit.

8. In combination with an auxiliary circuit having leads adapted to be connected to points in an electrical system under load for response to electrical conditions at such points, such leads and connections including contacts subject to formation of layers of low conductivity and being incapable of being broken down by voltages less than a predetermined value safely withstood by such auxiliary circuit, a source of restoration current having a voltage exceeding such predetermined break down value and conductors connecting said current source with said leads, said source of restoration current having only such contacts as are included within the circuit of said conductors, whereby the reliability and continuity of the restoration current source itself is assured by the operation thereof.

RALPH SHERMAN.

REFERENCES CITED

The following references are of record in the file of this patent:

UNITED STATES PATENTS

| Number | Name | Date |
|---|---|---|
| 2,123,966 | Rees | July 19, 1938 |
| 2,183,838 | Hornickel | Dec. 19, 1939 |
| 2,215,910 | O'Hagen | Sept. 24, 1940 |
| 2,232,715 | Matthews | Feb. 25, 1941 |